Figure 1:
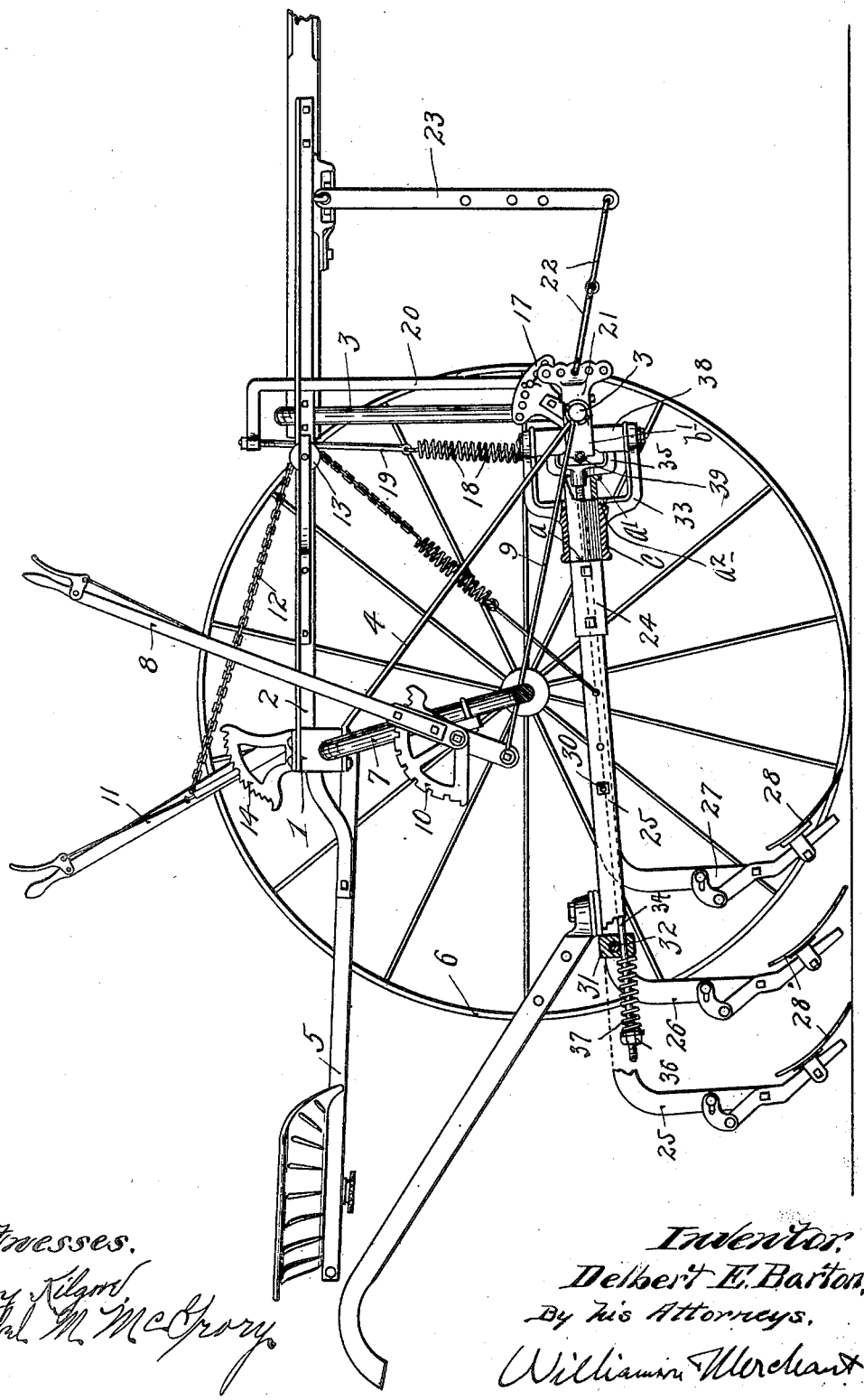

No. 668,124. Patented Feb. 12, 1901.
D. E. BARTON.
CULTIVATOR.
(Application filed Nov. 10, 1900.)
(No Model.) 2 Sheets—Sheet 1.

Witnesses.
Harry Kilgore
Mabel M. McGrory

Inventor.
Delbert E. Barton,
By his Attorneys,
William Merchant

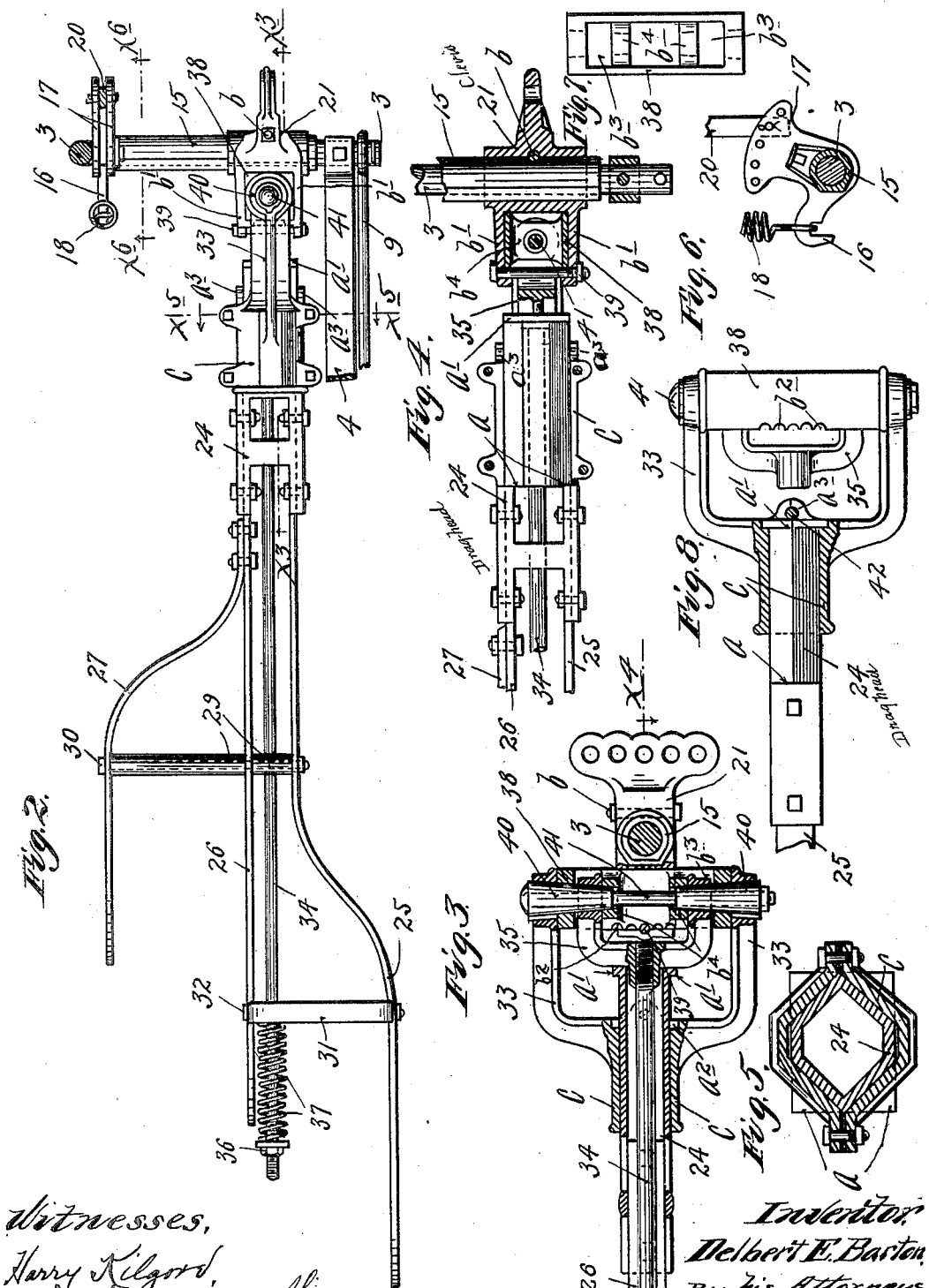

United States Patent Office.

DELBERT E. BARTON, OF MINNEAPOLIS, MINNESOTA.

CULTIVATOR.

SPECIFICATION forming part of Letters Patent No. 668,124, dated February 12, 1901.

Application filed November 10, 1900. Serial No. 36,008. (No model.)

*To all whom it may concern:*

Be it known that I, DELBERT E. BARTON, a citizen of the United States, residing at Minneapolis, in the county of Hennepin and State of Minnesota, have invented certain new and useful Improvements in Cultivators; and I do hereby declare the following to be a full, clear, and exact description of the invention, such as will enable others skilled in the art to which it appertains to make and use the same.

My invention relates to cultivators and other tillage machines which employ drag-bars mounted for pivotal motion in both vertical and horizontal planes, and has for its object to provide certain improvements whereby the lateral guiding action of the drag-bars is rendered light and easy.

To this end my invention consists of the novel devices and combinations of devices hereinafter described, and defined in the claims.

The invention is illustrated in the accompanying drawings, wherein like notations refer to like parts throughout the several views.

In said drawings, Figure 1 is a view in vertical section taken directly inside of the right wheel of a cultivator, showing most of the parts in elevation, but some in vertical section, with others broken away and some parts being removed. Fig. 2 is a detail chiefly in plan, but partly in horizontal section, showing one of the gangs with the pivotal bearings and the draft devices for the same. Fig. 3 is a detail in vertical section on the line $x^3 \, x^3$ of Fig. 2 with some parts shown in elevation. Fig. 4 is a horizontal section on the line $x^4 \, x^4$ of Fig. 3. Fig. 5 is a vertical cross-section on the line $x^5 \, x^5$ of Fig. 2. Fig. 6 is a detail in cross-section on the line $x^6 \, x^6$ of Fig. 2. Fig. 7 is a detail showing one of the clevis-holding bearing-blocks detached. Fig. 8 is a view similar to Fig. 3, but with the draft-rod detached and the lateral-motion bearing-yoke interlocked with the forward end of the drag-bar.

The numerals 1 to 5, inclusive, represent the relatively-fixed parts of the main frame. The numeral 6 represents one of the wheels; 7, the wheel-arch; 8, 9, and 10, the parts for adjusting the wheel-arch and holding the same in any desired adjustment in respect to the main frame to raise or lower the seat-level; 11, 12, 13, and 14, the parts for adjusting and yieldingly supporting the drag-bars or shovel-gangs for any desired depth of run; 15, the horizontal pivot-sleeves mounted on the horizontal portions of the fixed arched bar 3 and provided with the angular projections 16 and 17 for coöperation with the parts 18, 19, and 20 to afford a balancing device applied to the drag-bars or gangs; 21, the main drafthead mounted on the rotary sleeve 15; 22, the stay-chains, and 23 the whiffletree-hangers. All of the foregoing parts are of the customary standard form and serve the well-known customary functions.

24 represents what may conveniently be called the "drag-bar" and has the several beams 25 26 27 applied thereto in the customary way. The shovels 28 are also applied to the beams in the usual manner. As shown, the outside or longest beam 25 and the central beam 26 are bolted directly to the drag-head 24, and the inside or shortest beam 27 is bolted to the central beam 26. The three beams 25, 26, and 27 are suitably spaced apart and braced laterally in respect to each other by spacing-spools 29 and nutted draw-bolts 30. The beams 25 and 26 are also spaced apart and rigidly tied together by a flanged cross-bar 31 and nutted bolt 32 of proper construction to afford a suitable point for the application of the draft strain under my improvement, as will presently more fully appear.

The drag-bar 24 is shouldered, as shown at $a$, and the portion thereof rearward of the shoulder is of skeleton form, open below, while the portion forward of the shoulder is of polygonal form in cross-section, as shown in Fig. 5, and is provided at its forward end with a flange or collar $a'$, for a purpose which will later appear.

The main draft-head or clevis 21 is sleeved on the pivot-sleeve 15, and said parts 15 and 21 are of such shape in cross-section that the clevis or draft-head 21 cannot turn on the pivot-sleeve 15, as best shown in Fig. 3, and the said two parts are locked together by a nutted drift-bolt $b$, as best shown in Figs. 2 and 4, so as to prevent any sliding motion of the draft-head 21 on the pivot-sleeve 15.

A lateral-motion bearing-yoke 33 is pivoted to the main draft-head 21 and is of such construction as to afford a guide for the forward end of the drag-bar 24. As shown, said lateral bearing-yoke 33 is formed in two sections, which are bolted together, and these are of such shape as to afford a hub portion c, which is sleeved on the polygonal or forward portion of the drag-bar 24, as best shown in Figs. 1, 2, 3, 4, and 5. With this construction so far noted it is obvious that the main draft-head 21 is mounted to turn substantially on a horizontal pivot, thereby affording the vertical pivotal motion to the drag-bar or gang, and that the yoke 33 is connected to the draft-head 21 on substantially a vertical pivot, thereby affording the lateral pivotal motion to the drag-bar and gang.

A draft-rod 34 is detachably secured at its forward end to a yoke 35, which is pivotally connected to the main draft-head 21 on the same axis as the lateral bearing-yoke 33. The draft-rod 34 passes rearward through the drag-bar 24, substantially on the median line of the gang, and has its rear end portion extended through the combined spacing and push-bar 31, which, as shown, connects the outer beam 25 with the central beam 26 of the gang. The rod 34 is screw-threaded at its rear end and is fitted with a nut 36, between which and the bar 31 reacts a spring 37, encircling the rod, as shown in Figs. 1 and 2. The bar 31 is flanged to engage the beams 25 and 26 and is of the proper strength to receive the draft strain, which is applied thereto through the rod 34 and the spring 37.

With the parts constructed and mounted relative to each other, as hereinbefore described, it is obvious that the gang of shovels is pushed or pulled from behind instead of being pulled from the forward end of the drag-bar, as has hitherto been the custom. It is also obvious that the draft strain is applied to the push-bar 31, and therethrough to the gang, under a yielding action, in virtue of the cushioning-spring 37. It must be equally clear that the draft devices are so applied to the gang that the draft strain is received on the gang independently of the lateral-motion bearings for the drag-bar and gang. Otherwise stated, the draft strain is received by the drag-bar or gang without any portion thereof falling on the lateral-motion bearings. The lateral-motion bearing-yoke 33 simply upholds the forward end of the drag-bar 24 and serves as a guide to the same with freedom for sliding motion of the said parts relative to each other. Otherwise stated, under the draft strain the drag-bar is free to slide longitudinally in the lateral bearing-yoke 33 for a limited distance. The extent of this sliding motion is determined by the tension of the spring 37 in respect to the backward movement of the drag-bar in the yoke 33 and by the draft-yoke 35 in respect to the rearward motion of the yoke 33 on the drag-bar when the machine is at work.

In view of the fact that the draft strain is applied to push the drag-bar or gang from the rear instead of being applied to pull the same from the front the gang becomes very much easier to guide for the required lateral action when the machine is at work. As shown, the draft strain is applied at or near the center of the load on the shovels when the machine is at work. It is desirable to get the point of application to the rear of the load, and the farther that the point of application of the draft is distant toward the rear from the lateral-motion pivot of the gang the easier it will be to steer the gang for the desired lateral motion when the machine is at work. The point of application must be at some point rearward of the lateral-motion pivot in order to gain the advantage of my improvement and should be as far distant as practicable to the rear thereof, according to the nature of the gang and the machine to which the improvement is applied. In virtue of the fact that the draft strain falls on the drag-bar without any portion thereof coming onto the lateral-motion bearings it follows that the friction is greatly reduced on the said bearings. Hence this is important for making the lateral guiding action easy. By thus relieving the lateral-motion bearings from the draft strain and applying the draft at a point as far as possible toward the rear of the gang I minimize the power required for the lateral guiding of the gang.

It is well known that with the use of cultivators the lateral guiding motion of the gangs is the most tiresome to the operator. The importance of my improvement will therefore be readily appreciated.

Directing attention to certain details, it may be seen that the main draft-head or clevis 21 is provided with rearwardly-projecting lugs $b'$, as best shown in Fig. 4, between which lugs $b'$ is seated the bearing-block 38, of rectangular form in cross-section, as best shown in Figs. 4 and 7. Said bearing-block 38 is provided on its rear face with several notches $b^2$, as best shown in Figs. 3 and 8, with any one of which may engage the clevis-bolt 39, thereby affording means for the front end vertical adjustment of the draft device relative to the forward end of the drag-bar. Said bearing-block 38 is cut away, as shown in Fig. 7, to afford openings $b^3$ and cross-ribs $b^4$, suitably spaced apart from the end walls of the block for seating the draft-rod yoke 35. Said block 38 is also centrally perforated for coöperation with perforations in the ends of the yokes 33 and 35 to receive conical bearings 40 and a nutted draw-bolt 41, as best shown in Fig. 3. When the conical bearings 40 are drawn into working position by the bolt 41, as best shown in Fig. 3, the bearing-surfaces for the draft strain are afforded by the block 38, the yoke 35, and the conical bearings 40, while the lateral bearing-yoke 33 is left free to turn on the outer ends of the bearing-cones 40 without receiving any strain whatever from the draft.

It was noted that the forward end of the drag-bar 24 is provided with a flange or collar $a'$.

The lateral bearing-yoke 33 is provided with a corresponding recess or seat $a^2$, as best shown in Fig. 3, for receiving the collar $a'$ of the drag-bar 24 when the parts come into the position shown in Fig. 8. It was noted that the draft-rod 34 is detachably connected to the yoke 35. As shown, the rod 34 and its yoke 35 have screw-threaded engagement with each other. In virtue of this detachable feature the rod 34 may be separated from the yoke 35, thereby permitting the parts to assume the position shown in Fig. 8 under the action of the draft. Hence if the draft-rod 34 should be detached or any parts of the draft device should become broken the drag-bar would simply drop back in the bearing-yoke 33 until the collar $a'$ of the drag-bar engages with the seat $a^2$ of the yoke 33, as shown in Fig. 8, and the gang will then be pulled from the forward end of the drag-bar under the interlocking engagement of said surfaces or parts $a'$ and $a^2$. Hence even if the draft-rod 34 be detached or become broken the drag-bar 24 and the lateral bearing-yoke 33 cannot separate from each other backward, and to prevent any forward motion of the drag-bar relative to the bearing-yoke 33 by a backward motion of the machine a stop-bolt 42 is applied to projecting lugs $a^3$, formed on the yoke 33 in position to be directly in front of the drag-bar when the parts are in the position shown in Fig. 8. Whether the stop-bolt 42 be used or not, it is obvious that when the draft-rod 34 is detached or any portions of the draft devices become broken the drag-bar or gang will be pulled from the forward end with substantially the same effect, so far as the lateral guiding action is concerned, as has hitherto been the result of the old construction.

It is of course obvious that the parts 34 and 35 constitute a draft device, whether used with or without the nut 36 and the spring 37. Inasmuch as the part 35 can be separated from the main clevis 21 by the removal of the bearing-cones 40 and the pin 41 the said parts 34 and 35 constitute a detachable draft device. Moreover, as the rod 34 can be separated from the yoke 35 the part 34 of itself may be removed without removing the yoke 35, and for this reason alone the draft device is detachable. Otherwise stated, the said draft device is detachable in two ways. Again, when the spring 37 is used, as described, the draft-spring is applied to the drag-bar yieldingly or under a spring-cushioned action and hence the parts 34, 35, 36, and 37 constitute a yielding draft device.

By actual experience with full-sized machines under severe field tests I have demonstrated the efficiency of the invention herein disclosed for the purposes had in view. In said practice I have found that the shovel-gangs are much more easily guided in the lateral action than when connected up and provided with draft appliances attached thereto in the old way or as done prior to my present invention.

It will be understood that while the construction shown is simple, compact, convenient, cheap, and reliable, and therefore to be preferred, modifications might be employed without departing from the principle of my invention. It is of course obvious that the gangs may have any desired number of shovels and shovel-beams.

While the invention has been illustrated as applied to a cultivator, it must be obvious that the same is generally applicable to all tillage or other machines having drag-bars mounted for lateral pivotal motion, or, in other words, the invention is generally applicable wherever the corresponding function is needed.

What I claim, and desire to secure by Letters Patent of the United States, is as follows:

1. In a cultivator or other tillage-machine, the combination with a drag-bar mounted for lateral pivotal motion, of a draft device mounted to apply the draft strain to the drag-bar at some point to the rear of the bar's lateral-motion pivot, whereby the lateral guiding action is rendered light and easy, substantially as described.

2. In a cultivator or other tillage-machine, the combination with a drag-bar mounted for lateral pivotal motion, of a draft device mounted to apply the draft strain to the drag-bar, so as to push the bar from a point at or near the center of the load, instead of pulling the same from the forward end of the drag-bar, substantially as and for the purposes set forth.

3. In a cultivator or other tillage-machine, the combination with a drag-bar mounted for lateral pivotal motion, of a draft device mounted to yieldingly apply the draft strain to the drag-bar at some point to the rear of the bar's lateral-motion pivot, substantially as and for the purposes set forth.

4. In a cultivator or other tillage-machine, the combination with a drag-bar mounted for lateral pivotal motion, of a draft device mounted to apply the draft strain to the drag-bar independently of the lateral-motion bearings for the bar, substantially as and for the purposes set forth.

5. In a cultivator or other tillage-machine, the combination with a drag-bar mounted for lateral pivotal motion, of a draft device yieldingly connected to the draft-bar independently of the lateral-motion bearings of the bar, and at some point rearward of the lateral-motion pivot, substantially as and for the purposes set forth.

6. In a cultivator or other tillage-machine, the combination with a horizontally-pivoted main draft-head, of a lateral-motion bearing-yoke pivoted to said main draft-head, a drag-bar having its forward end upheld and guided by said lateral-motion bearing-yoke with freedom for longitudinal sliding motion of the bar in the yoke, and a draft device connecting said